(No Model.) 12 Sheets—Sheet 1.
C. SINNING & J. T. AVERY.
LASTING MACHINE.
No. 387,926. Patented Aug. 14, 1888.
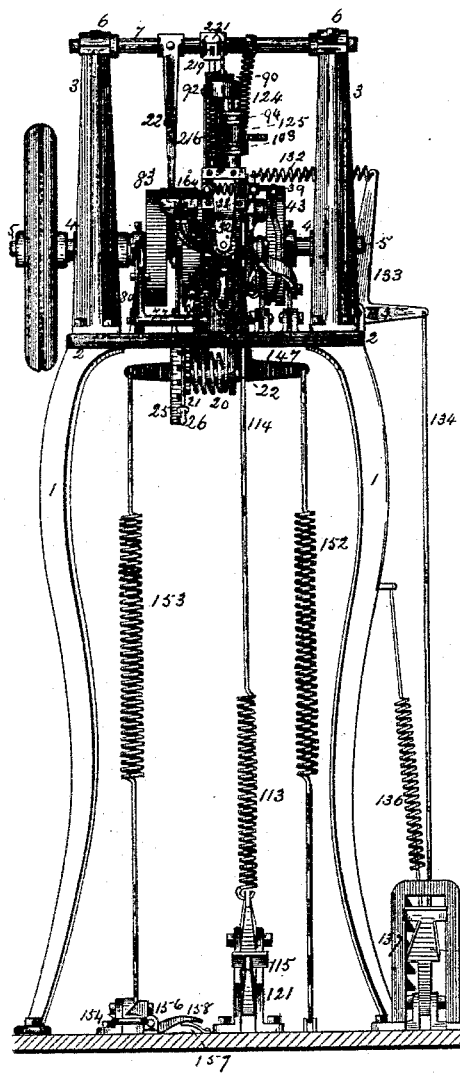
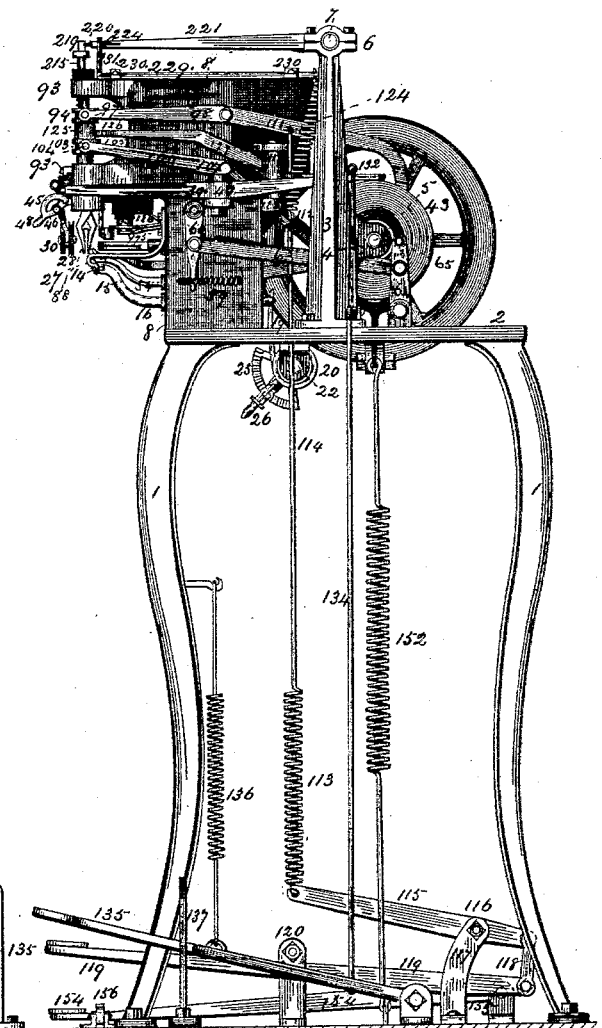
Attest:
H. T. Knight
E. Arthur
Inventors:
Charles Sinning
John T. Avery
By Knight Bros
Attys (No Model.) 12 Sheets—Sheet 2.
C. SINNING & J. T. AVERY.
LASTING MACHINE.
No. 387,926. Patented Aug. 14, 1888.
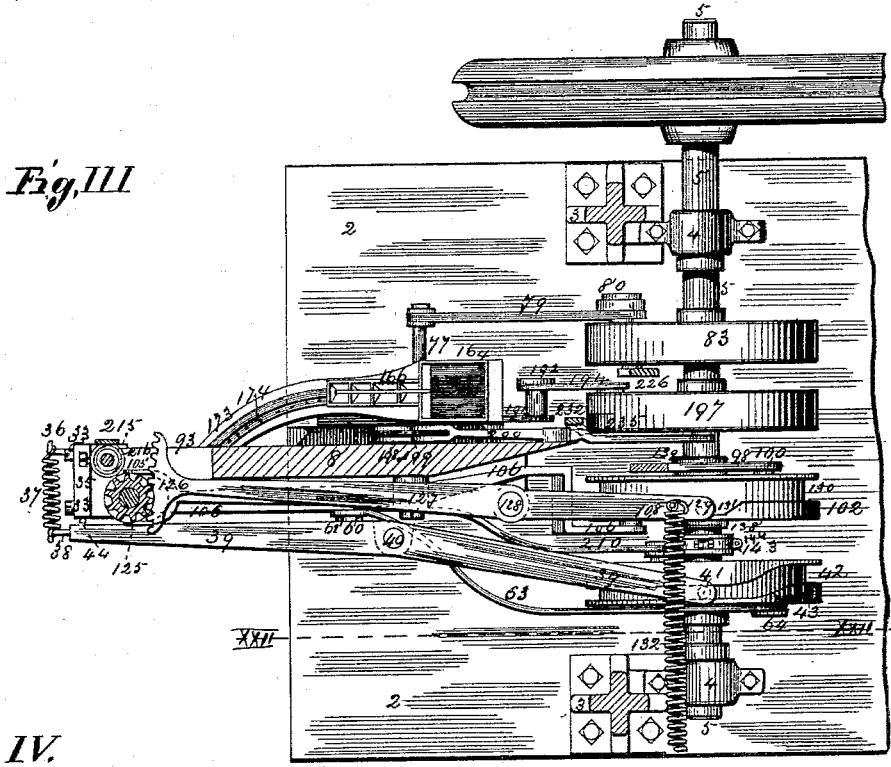
Fig. III
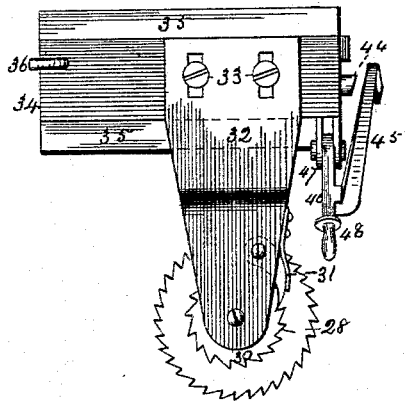
Fig. IV.
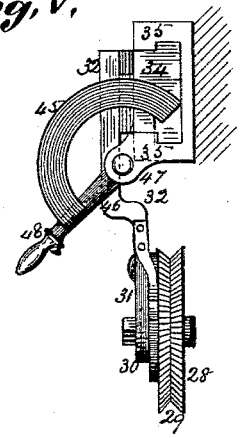
Fig. V.
Attest:
H. S. Knight
E. Arthur
Inventors:
Charles Sinning
John T. Avery
By Knight Bro.
Attys.

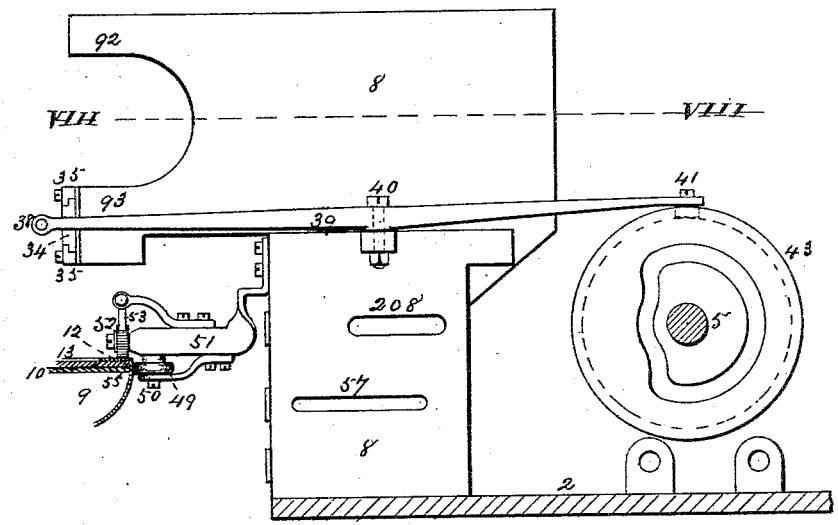

(No Model.) 12 Sheets—Sheet 4.
C. SINNING & J. T. AVERY.
LASTING MACHINE.
No. 387,926. Patented Aug. 14, 1888.
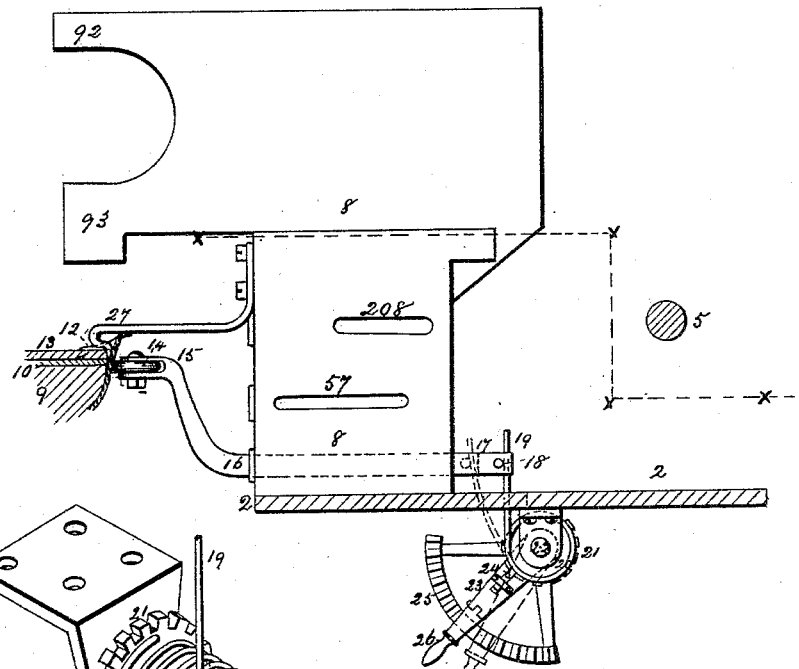
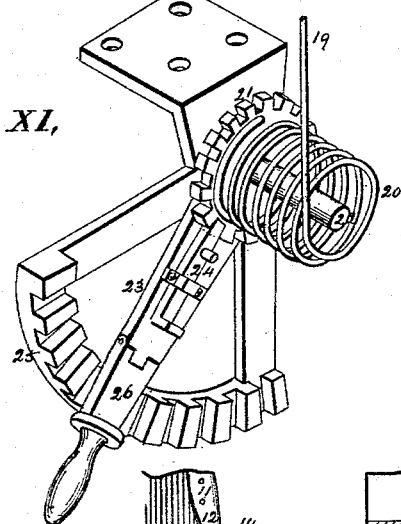
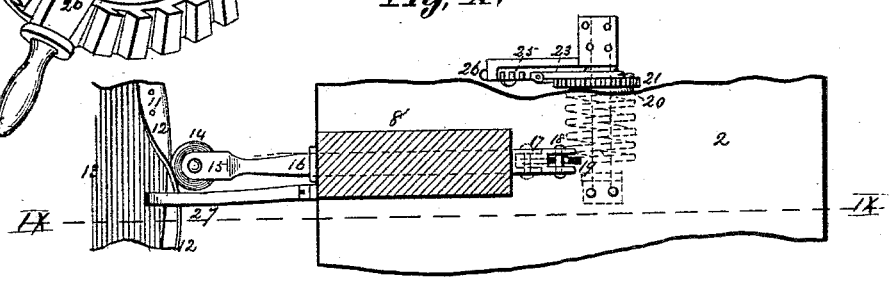

(No Model.) 12 Sheets—Sheet 5.
C. SINNING & J. T. AVERY.
LASTING MACHINE.
No. 387,926. Patented Aug. 14, 1888.
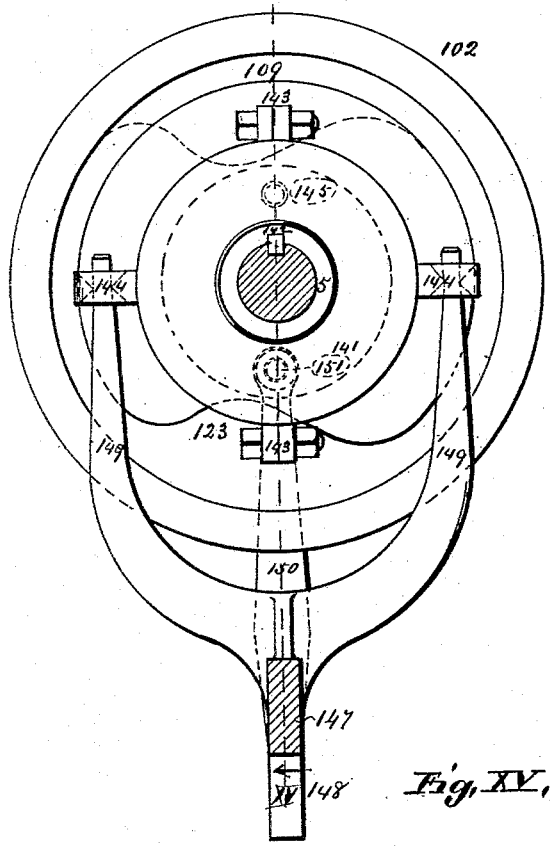
Fig. XIII.
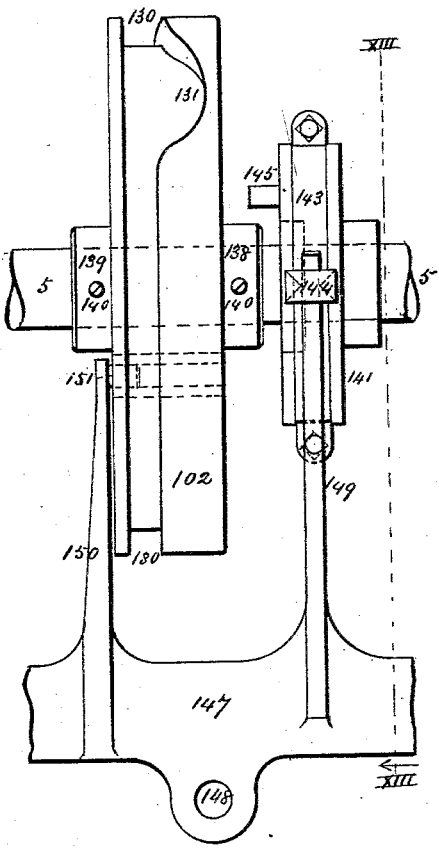
Fig. XIV.
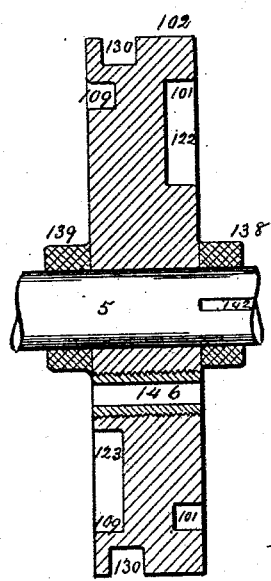
Fig. XV.
Attest:
H. S. Knight
E. Arthur
Inventors:
Charles Sinning
John T. Avery
By Knight Bros.
Attys (No Model.) 12 Sheets—Sheet 6.
C. SINNING & J. T. AVERY.
LASTING MACHINE.
No. 387,926. Patented Aug. 14, 1888.
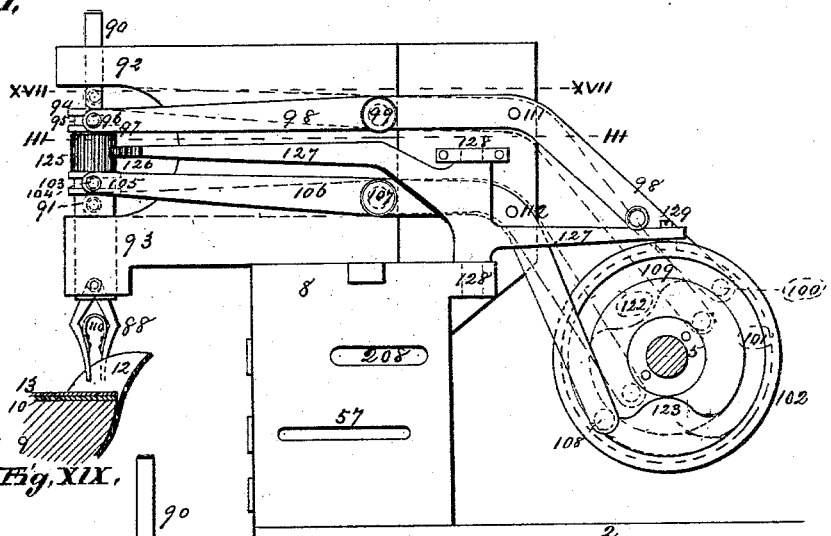
Fig. XVI.
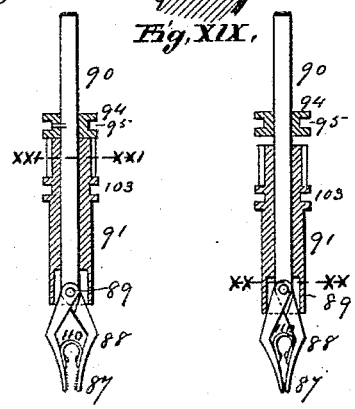
Fig. XVIII. Fig. XIX.
Fig. XX.
Fig. XXI.
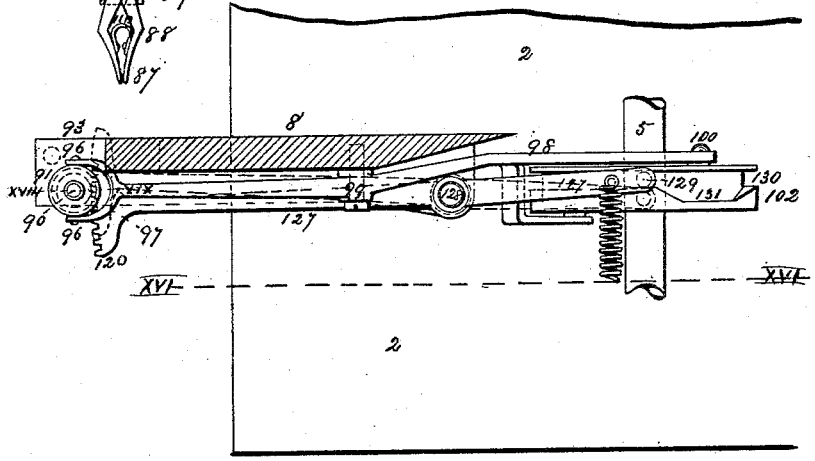
Fig. XVII.
Attest:
H. T. Knight
E. Arthur
Inventors:
Charles Sinning
John T. Avery
By Knight Bro.
Attys.

(No Model.) 12 Sheets—Sheet 7.
C. SINNING & J. T. AVERY.
LASTING MACHINE.
No. 387,926. Patented Aug. 14, 1888.
Fig. XXII.
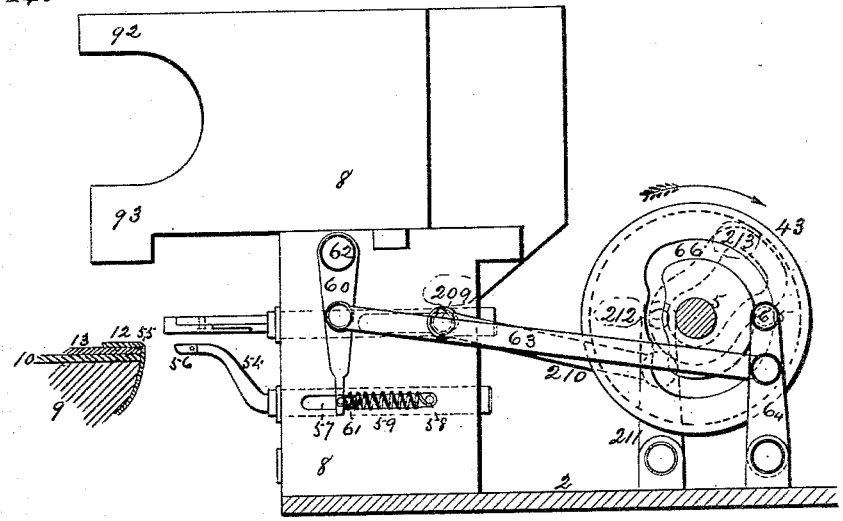
Fig. XXIII.
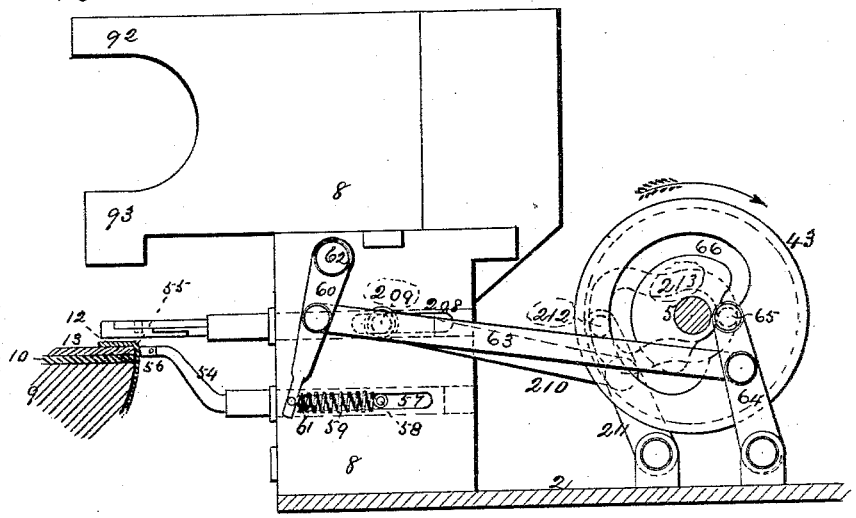
Attest:
H. Knight
E. Arthur
Inventors:
Charles Sinning
John T. Avery
By Knight Bro.
Attys.

(No Model.) 12 Sheets—Sheet 8.
C. SINNING & J. T. AVERY.
LASTING MACHINE.
No. 387,926. Patented Aug. 14, 1888.
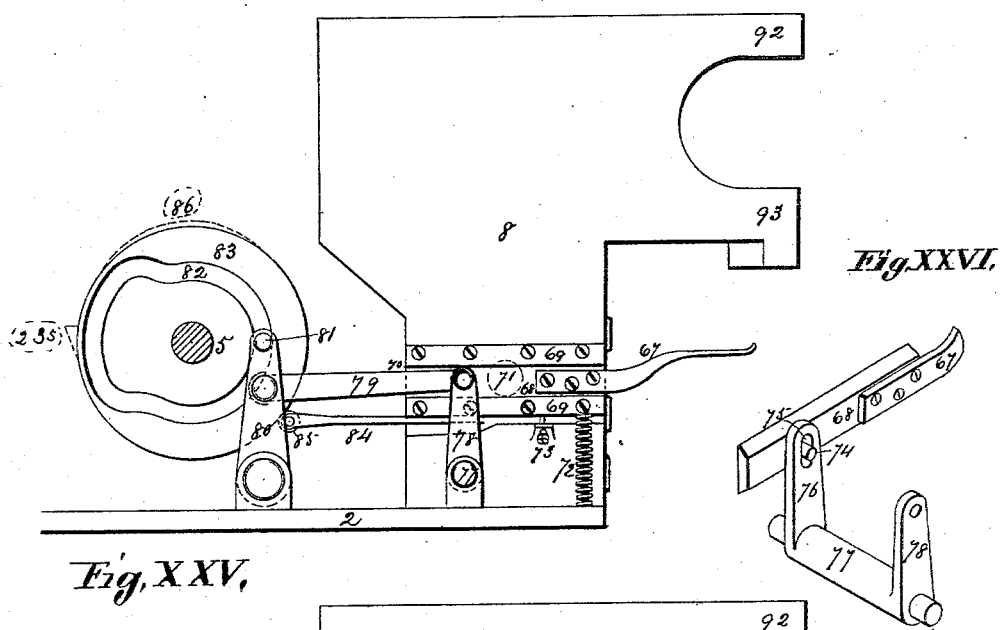
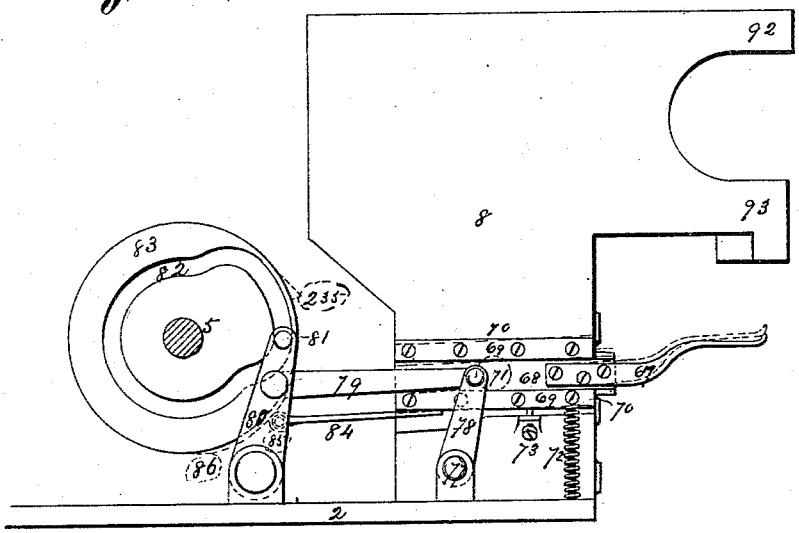
Attest:
H. S. Knight
E. Arthur
Inventors:
Charles Sinning
John T. Avery
By Knight Bros.
Attys.

(No Model.) 12 Sheets—Sheet 9.
C. SINNING & J. T. AVERY.
LASTING MACHINE.
No. 387,926. Patented Aug. 14, 1888.
Fig. XXVII.
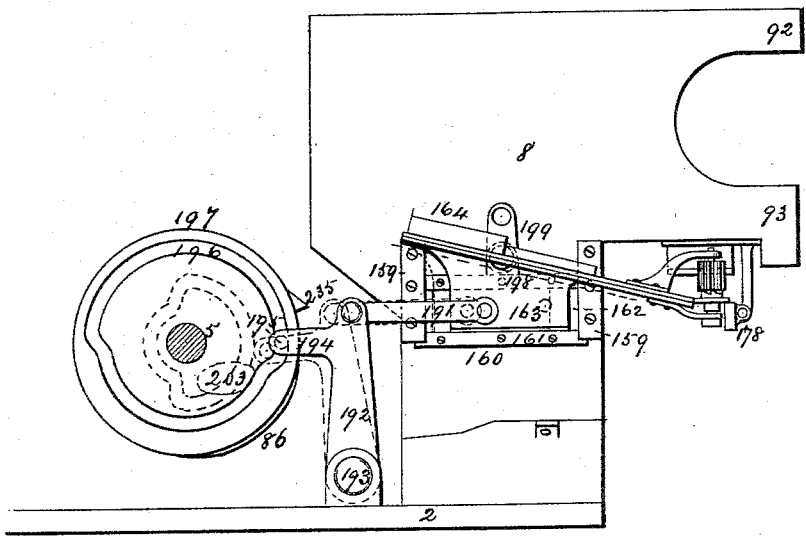
Fig. XXVIII.
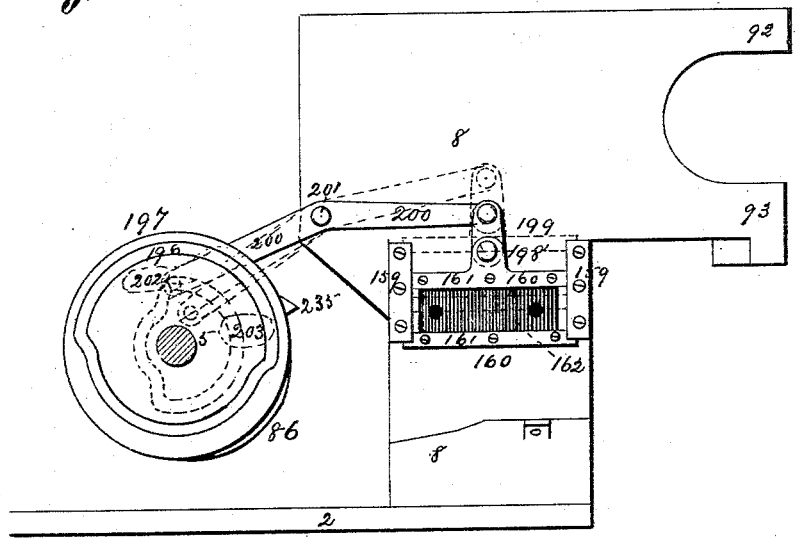

(No Model.) 12 Sheets—Sheet 10.
C. SINNING & J. T. AVERY.
LASTING MACHINE.
No. 387,926. Patented Aug. 14, 1888.
Fig. XXIX.
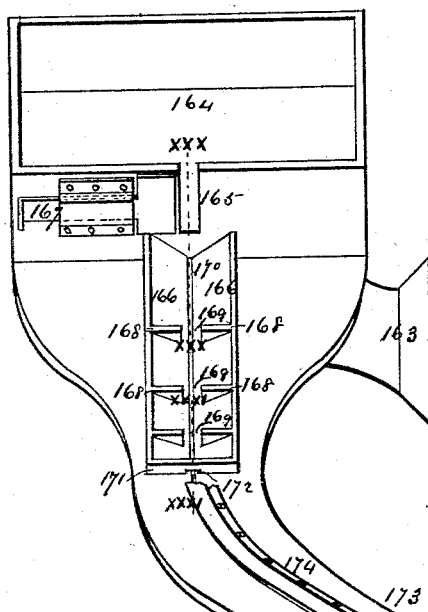
Fig. XXX.
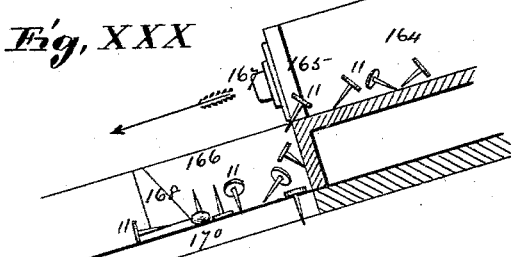
Fig. XXXI.
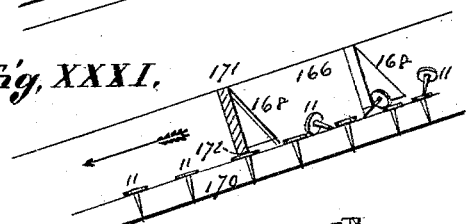
Fig. XXXIV.
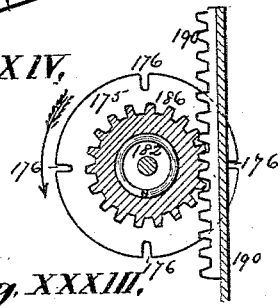
Fig. XXXII.
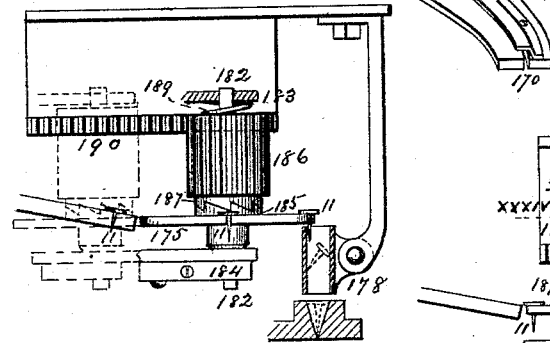
Fig. XXXIII.
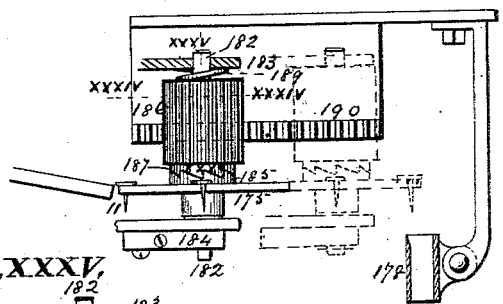
Fig. XXXV.
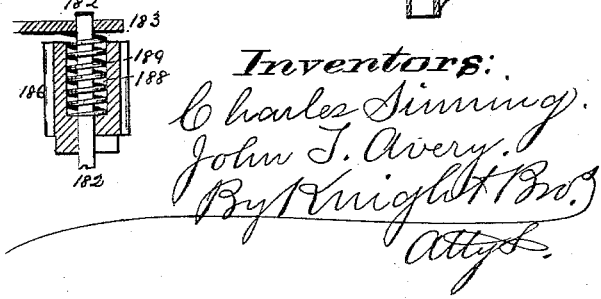
Attest:
H. Knight.
E. Arthur.
Inventors:
Charles Sinning.
John T. Avery.
By Knight H Bro.
Attys.

(No Model.) 12 Sheets—Sheet 11.
C. SINNING & J. T. AVERY.
LASTING MACHINE.
No. 387,926. Patented Aug. 14, 1888.
Fig. XXXVI.
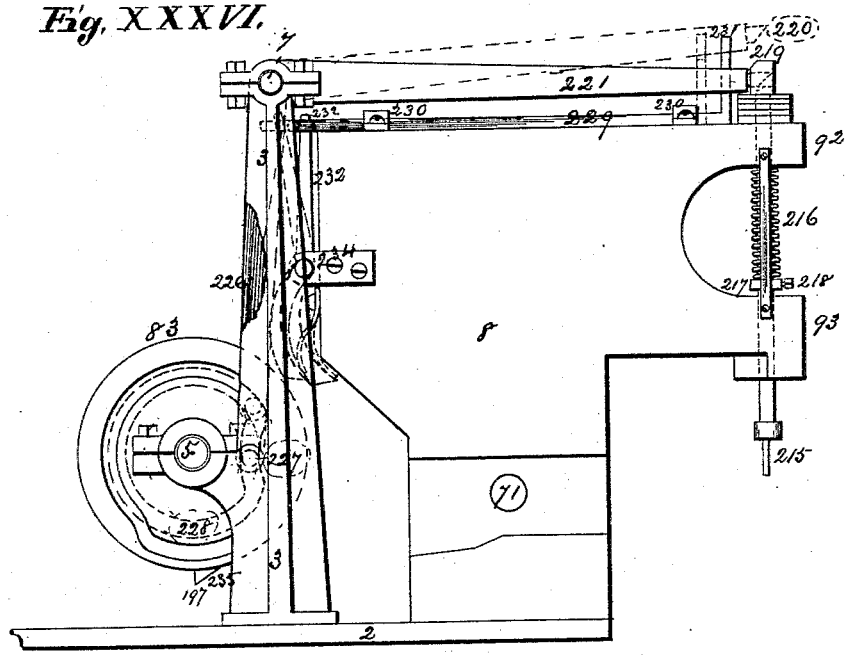
Fig. XXXVII.
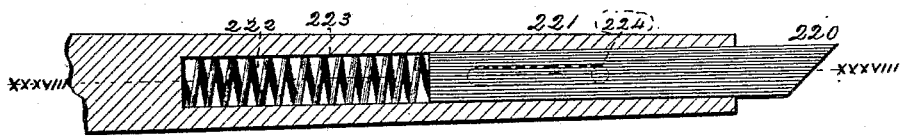
Fig. XXXVIII.
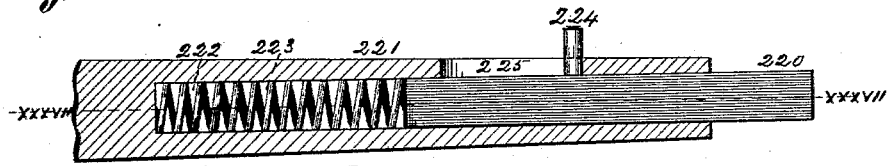
Fig. XXXIX.
Fig. XL.
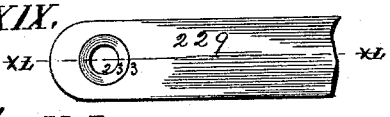
Attest:
H. Knight
E. Arthur
Inventors:
Charles Sinning
John T. Avery
By Knight Bro.
Attys (No Model.) 12 Sheets—Sheet 12.
C. SINNING & J. T. AVERY.
LASTING MACHINE.
No. 387,926. Patented Aug. 14, 1888.
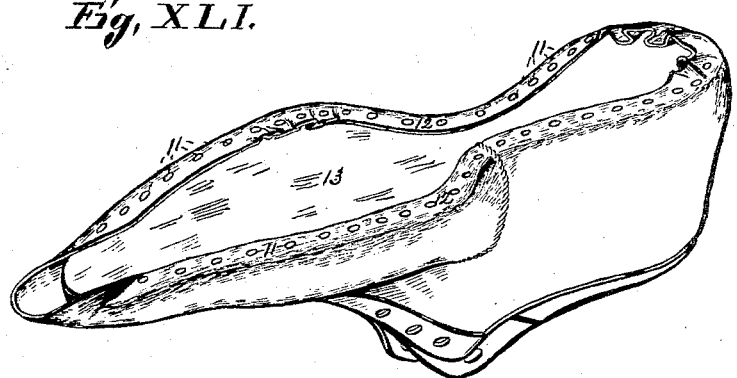
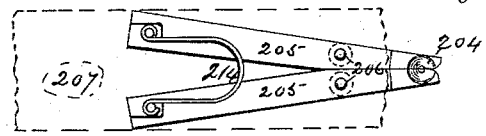
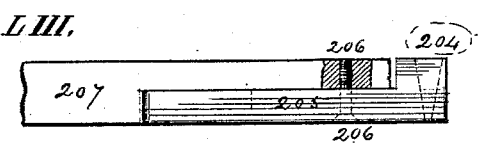
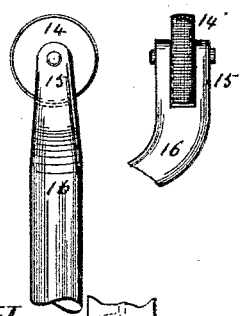
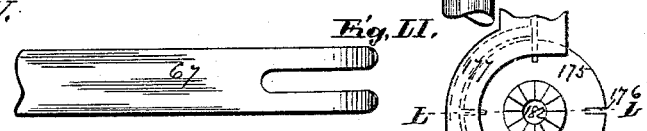
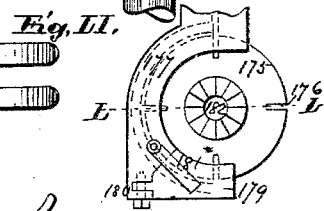
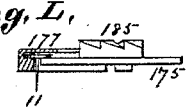
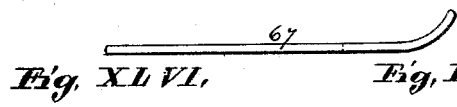
Attest:
H. Knight
E. Arthur
Inventors:
Charles Sinning
John T. Avery
By Knight Bro.
Attys

UNITED STATES PATENT OFFICE.

CHARLES SINNING AND JOHN T. AVERY, OF ST. LOUIS, MISSOURI.

LASTING-MACHINE.

SPECIFICATION forming part of Letters Patent No. 387,926, dated August 14, 1888.

Application filed February 2, 1888. Serial No. 262,808. (No model.)

*To all whom it may concern:*

Be it known that we, CHARLES SINNING and JOHN T. AVERY, both of the city of St. Louis, in the State of Missouri, have invented a certain new and useful Improvement in Lasting-Machines, of which the following is a full, clear, and exact description, reference being had to the accompanying drawings, forming part of this specification.

This is a machine which acts automatically to apply and secure the upper to the last when the latter is held against the guiding devices of the machine.

Figure I is a front elevation of the machine. Fig. II is a side elevation of the machine. Fig. III is a horizontal section at III III, Fig. XVI. Fig. IV is a front elevation of the feeding device, enlarged. Fig. V is a side elevation of the same. Fig. VI is a vertical section at VI VI, Fig. VIII, showing the stationary guide, feed-lever, and actuating-cam. Fig. VII is a perspective view of the stationary guide. Fig. VIII is a horizontal section at VIII VIII, Fig. VI. Fig. IX is a vertical section at IX IX, Fig. X. Fig. X is a horizontal section at X X, Fig. IX. Fig. XI is a perspective view of the tension adjustment. Fig. XII is an elevation of the handle and pawl of the tension adjustment. Fig. XIII is a vertical transverse section at XIII XIII, Fig. XIV. Fig. XIV is a front elevation of the loose cam and clutch by which the gripping and crimping devices are operated. Fig. XV is a vertical section of the loose cam at XV XV, Fig. XIII. Fig. XVI is a detail side elevation showing the gripper with actuating devices of the same, the shaft being in section at XVI XVI, Fig. XVII. Fig. XVII is a horizontal section at XVII XVII, Fig. XVI. Figs. XVIII and XIX are vertical sections at XVIII XIX, Fig. XVII, showing the grippers, respectively, open and closed. Fig. XX is a horizontal section at XX XX, Fig. XIX. Fig. XXI is a horizontal section at XXI XXI, Fig. XVIII. Figs. XXII and XXIII are vertical sections at XXII XXII, Fig. III, showing the pusher and tack-carrier in different positions. Figs. XXIV and XXV are detail elevations showing the folder in different positions. Fig. XXVI is a detail perspective view of a rock-shaft, &c. Fig. XXVII is a detail side elevation showing the tack-carrier and actuating mechanism. Fig. XXVIII is a detail side elevation showing the tack-carrier slide and actuating mechanism. Fig. XXIX is a front view of the tack-carrier with the tack manipulator or straightener and tack-race. Fig. XXX is a vertical longitudinal section at XXX XXX, Fig. XXIX. Fig. XXXI is a vertical section at XXXI XXXI, Fig. XXIX. Fig. XXXII is a detail side elevation showing the lower end of the tack-race and the tack-deliverer in side elevation and the tack guide and carrier in vertical section, the parts being shown in full lines in their forward and lower position and in broken lines in their backward and lower position. Fig. XXXIII is a similar view to Fig. XXXII except that the parts are shown in full lines in their backward and upper position and in broken lines in their forward and upper position. Fig. XXXIV is a horizontal section at XXXIV XXXIV, Fig. XXXIII. Fig. XXXV is a vertical section at XXXV, XXXV, Fig. XXXIII. Fig. XXXVI is a detail side elevation showing devices for driving the tacks. Fig. XXXVII is a vertical section of the front part of the lifting-arm of the tack-driver at XXXVII XXXVII, Fig. XXXVIII. Fig. XXXVIII is a horizontal section at XXXVIII XXXVIII, Fig. XXXVII. Fig. XXXIX is a detail top view of part of the sliding trip-rod by which the trip-catch is drawn back to release the tack-driver from its lifting-arm. Fig. XL is a vertical section at XL XL, Fig. XXXIX. Fig. XLI is a perspective view showing the last with an upper-leather thereon, but the attachment of the upper to the insole incomplete. Fig. XLII is a top plan of the tack-carrier. Fig. XLIII is a side elevation of the tack-carrier. Fig. XLIV is a top plan of the folder. Fig. XLV is a side elevation of the folder. Fig. XLVI is a top plan of the pusher. Fig. XLVII is a side elevation of the pusher. Fig. XLVIII is a top view of the lower guide-roll. Fig. XLIX is a side elevation of the lower guide-roll. Fig. L is a vertical section at L L, Fig. LI. Fig. LI is a top plan of the tack deliverer and guide. Fig. LII is a front elevation of the tack deliverer and guide.

The machine may have any desired form of supporting-frame, and it may be constructed in any suitable way to give support to the working parts.

As shown in the drawings, (see Figs. I and II,) 1 are legs which support a table, 2.

3 3 are standards giving bearing at 6 to the rock-shaft 7.

At 4 are the bearings of the cam-shaft 5. The cam-shaft has fixed upon it a circumferentially-grooved fly-wheel to receive a belt, by which the shaft is turned. (See Figs. I, II, and III.)

8 is a vertical plate giving bearing to many of the moving parts.

9 is the last, and 10 a metal plate upon it to clinch the tacks 11 after they have been driven through the edge 12 of the upper and the insole 13. (See Figs. VI, IX, X, XVI, XXII, XXIII, and XLI.) After the last with the insole upon it has been inserted in the upper, they are placed against the side bearing-roller, 14, having a rubber periphery, so that it will yield in a proper degree to the pressure of the upper and will cause no marks upon or other injury to it. The side bearing-roller is journaled in the forked end 15 of a bar, 16, that has endwise motion in the plate 8. The inner end of the bar 16 is slotted at 17 and may have a cross-pin, 18, against which bears the finger 19 of a spiral or other spring, 20. The spring 20 has one end fixed to a spur-wheel, 21, having bearing on a pin, 22.

23 is an arm also pivoted on the pin 22, and which has a sliding bolt, 24, engaging the teeth of the spur-wheel 21.

25 is a quadrant or curved cog-rack concentric with the pin 22 and in such position that a tooth (see Fig. XII) upon the hinged end 26 of the arm 23 may be made to engage between any of the teeth of the quadrant. This described device is for the purpose of increasing or diminishing the power of the spring 20, which may be thus quickly done at any time. The mean power of the spring may be adjusted to a greater extent by disengaging the bolt 24 from the wheel 21 and turning the wheel, after which the bolt is again engaged with the wheel. (See Figs. I, II, III, IX, X, XI, XII.)

27 is a curved finger or guide, whose end rests upon the insole just in advance of the part of the upper which is folded down thereon, and which thus forms a guide to keep the insole in place at this point. (See Figs. IX and X.)

28 is the feed-wheel, which rests on the edge 12 of the upper, where it is fastened down upon the insole 13. The feed-wheel is made rough at the periphery, so as to take hold of the leather and thus feed the last forward. This roughened face is preferably made by grooving the periphery circumferentially and forming transverse ratchet-teeth on the same. (See Figs. IV and V.) There may be one or more of the circumferential grooves 29, or said groove or grooves may be dispensed with, for they are not regarded as essential, although very advantageous, as with them the feed-wheel takes a better hold on the leather 12, and transverse movement of the last is checked. In one piece with the feed-wheel or fast on the side of the same is a ratchet-wheel, 30, whose teeth are preferably inclined in the opposite direction.

31 is a spring-pawl engaging the teeth of the wheel 30 and preventing backward rotation of the feed-wheel. (See Figs. I, II, IV, and V.)

The feed-wheel has bearing in a bracket, 32, connected by screws 33 to a slide-plate, 34. The screws pass through vertical slots in the bracket, which manner of attachment allows the vertical adjustment of the bracket and thus of the feed-wheel. (See Fig. IV.) The slide 34 works in horizontal guides 35 fixed to the projection 93 of the plate or standard 8.

36 is a pin or hook on the slide, on which is engaged one end of a spiral spring, 37, the other end being engaged on a hook or in an eye, 38, at the end of the lever 39. The lever 39 is fulcrumed at 40 and has at the opposite end to the hook 38 a depending pin or stud, 41, carrying preferably an anti-friction roller and which occupies a cam-groove, 42, in the periphery of the rotary cam 43 on the shaft 5. (See Figs. I, II, III, VI, and VIII.) The slide 34 has at one side a rounded projection or roller, against which the side of the lever 39 impinges on the forward movement of the lever and pushes the slide forward, and with it the feed-wheel, and as the latter bears upon the edge 12 of the upper the last is fed forward, (or from the right to the left.) On the return movement of the lever 39 the slide is drawn backward by the spring 37 and the feed-wheel turns backward, traveling on the leather 12. The backward movement of the slide is limited by a projection, 44, which comes in contact with a curved bar, 45, that is set obliquely to the projection. The bar 45 is attached by one end to an arm, 46, pivoted to a lug, 47, on the guide 35, the arm having a handle, 48, by which it is swung upward or downward on its pivot to change the position of the stop-bar, said bar being moved upward and backward to decrease the retrograde movement of the slide, and vice versa. The feed-wheel moves forward once for each rotation of the shaft 5. In addition to the side bearing, 14, and top bearing, 27, the last (with the upper on it) has side bearing against a roller, 49, turning in a fixed bearing, 50, on arm 51, and top bearing against a roller, 52, turning in a fixed bearing on the same arm. The roller or wheel 52 is preferably serrated at the circumference, and is prevented from turning backward by a spring-pawl, 53. (See Figs. VI and VII.)

Between the side bearings, 14 and 52, is a pusher, 54, which at intervals is pressed forward against the upper-leather just below the corner 55, so as to hold the upper firmly against the last at that point. The pusher has a rubber end, 56, to prevent any injury or marking of the leather. (See Figs. XXII, XXIII, XLVI, and XLVII.)

The shank of the pusher works in a guide-socket of the standard 8.

57 is a slot made from the socket through one or both sides of the standard, and in this slot works a pin or stud, 58, which prevents the turning of the shank in the socket. To the pin or stud 58 is attached one end of a spiral spring, 59, the other end being attached to an oscillating arm, 60.

61 is a pin or stud projecting from the pusher-shank through the slot 57, and against which the back of the arm presses in its backward movement and carries back the pusher with it. Thus the backward movement of the pusher is positive, while its forward movement is effected through means of the spring 59, and the movement is arrested by the impingement of the end or toe 56 of the pusher against the upper-leather upon the last. The arm is pivoted to the standard at 62.

63 is a rod pivoted at one end to the arm 60 and at the other to an oscillating arm, 64, pivoted at the lower end to the table. The upper end of the arm 64 carries at its side a pin or stud, 65, which is preferably armed with an anti-friction roller that enters the cam-groove 66 of the rotary cam 43. (See Figs. II, III, XXII, and XXIII.) It may be seen by the shape of the cam-groove that the pusher remains in its forward position, as seen in Fig. XXIII, only a short time, and is a longer time out of contact with the shoe, as shown in Fig. XXII. While it is in contact with the shoe the edge 12 of the upper at that point is turned over and made fast to the insole. The turning over of the edge 12 and pressing it down upon the insole is accomplished by the folder 67. (Shown in its forward position in Fig. XXV and in its backward position in Fig. XXIV.) The working end of the folder is shown in Figs. XLIV and XLV. The folder is attached to a slide, 68, that works between guides 69 of an oscillatory block, 70. This block is supported in a trunnion at 71, that has bearing in the standard 8.

72 is a spring connecting the front end of the block 70 to the table and tending to draw down that end of the block, so as to press down the folder on the edge 12 of the upper and force such edge with sufficient force onto the insole, and to yield when required where the edge is crimped, as at the toe of the shoe. The descent of the front end of the block 70 is limited by a stop-screw, 73, to which it is drawn by the spring 72 when not resting on the edge 12 of the leather. (See Figs. XXIV, XXV, and XXVI.) The end of the folder is curved upward to cause it to pass over the edge 12 without obstruction on its forward movement, (see Fig. XLVI,) and the end is slotted to allow the passage of the tack by which the edge 12 is secured to the insole. (See Fig. XLV.) The slide 68 has a stud, 74, which engages in an upright slot, 75, of an oscillating arm, 76, upon a rock-shaft, 77. The shaft 77 carries an arm, 78, connected by a rod, 79, to an oscillating arm, 80, whose lower end is hinged to the table and whose upper end carries at its side a stud, 81, that enters the cam-groove 82 of a cam, 83. Thus by the rotation of the cam the folder is actuated in its endwise movements. In the inception of the backward movement of the folder its end is lifted to relieve the leather from its pressure and to allow its easy backward movement. To effect this the block 70 is tilted slightly, which movement is accomplished by a tail, 84, extending from the rear end of the block and carrying an anti-friction roller, 85, which is depressed by a peripheral projection, 86, on the cam 197. (See Figs. XXIV, XXV, XXVI, XXVII, and XXVIII.)

The means for lifting the edge 12 of the leather into the position for the folder to act upon it will now be described.

The edge 12 is seized by the jaws 87 of vertically-moving grippers 88. (See Figs. XVI, XVIII, and XIX.) The gripper-jaws 87 are connected by a pintle, 89, to a stem or shaft, 90, on which is a sleeve, 91. The shaft has an upper bearing, 92, and has a lower bearing in the sleeve. The sleeve has bearing in a projection, 93, of the standard 8. Upon the shaft is a fixed collar, 94, that has a circumferential groove, 95. This groove receives the inturned studs 96 at the ends of the fork 97 of the lever 98, so that by the oscillation of the lever the grippers have vertical movement. The studs 96 are preferably armed with anti-friction rollers.

The lever 98 is fulcrumed to the standard 8 at 99, and has at the rear end a side stud, 100, entering a cam-groove, 101, in the side of the revolving cam, 102. (See Figs. II, III, XVI, XVII, and XIX.) The sleeve 91 has a circumferential groove, 103, receiving the inturned studs 104 at the ends of the fork 105 at the end of the lever 106. This lever is fulcrumed to the standard 8 at 107. Its rear end has a side stud, 108, which enters a cam-groove, 109, in the side of the rotary cam 102. The studs 96, 100, 104, and 108, like all the studs in the machine working in cam or other grooves, should be armed with anti-friction rollers to lessen the friction and wear and to give means of renewal by the supply of new rollers. In the simple work of the grippers, where no crimping (of the edge 12) is required, the gripper comes down with its jaws open, being held in this position by a spreading-spring, 110. This position is shown in Fig. XVIII. As the gripper descends, the edge 12 enters between the jaws, the sleeve 91 being now elevated. After the edge 12 has entered between the jaws, the sleeve descends and forces the jaws together on the edge of the leather. Next the shaft is raised, lifting the sleeve and leather with it until the leather is tight upon the last. Then the sleeve is lifted relatively to the shaft, which allows the jaws to spread open and release the edge 12. Just at this time the folder acts to fold down the edge upon the insole, and a tack is driven through them and clinched upon the metal sole-plate 10. The upward movement of the sleeve 91 and downward movement of the shaft 90 are positive, while the upward movement of the shaft and downward movement of the sleeve are not positive, but are produced by springs, which are shown in Figs. I and II, the holes 111 and 112 in the levers for the attachment of the springs being shown in Fig. XVI.

113 (see Figs. I and II) is a spring whose upper part ends in a rod, 114, turned into a hook at the upper end, which engages in a hole, 111, of the lever 98. The lower end of the spring 113 engages in the end of a lever, 115, fulcrumed at 116 to a standard, 117, on the base or floor, and connected by a link, 118, to the end of a treadle-lever, 119, fulcrumed to a standard, 120. The free end of the treadle is held down by any suitable catch, 121. While the stud 100 of the lever 98 is in the part of the cam-groove 101 which is concentric with the circumference of the cam, the gripper-shaft 90 is in its lower position; but when the stud arrives at the recess or enlargement 122 of the groove the spring 113 pulls down the inner end of the lever and raises the shaft and gripper with the sleeve, the latter acting to hold the jaws closed upon the edge 12 of the leather. (See Figs. XIII, XV, and XVI.) The sleeve is in its upper position while the stud 108 is in the part of the cam-groove 109 concentric with the circumference of the cam; but when the stud arrives at the enlargement or recess 123 of the cam-groove the spring 124 pulls up the inner end of the lever and depresses the outer end of the lever and the sleeve 91. The spring 124 extends from the upper part of one of the standards 3 to the lever 106, to which its lower end is attached by the hooked end of the spring engaging in the hole 112. At some points (for instance, at the toe of the shoe) the edge 12 requires to be crimped, and this is done by causing the gripper to turn with the sleeve 91, and for this purpose the sleeve carries a spur-wheel, 125, that is in engagement with a cog-segment, 126, upon a lever, 127, adapted to oscillate in a horizontal plane upon the bearings 128. The rear end of this lever carries a stud, 129, which extends downward into a cam-groove, 130, in the periphery of the rotary cam 102. The groove 130 has an enlargement, 131, which allows the movement of the lever by giving space for the stud to move to one side. This side movement of the stud is accomplished by a spring, 132, that is thrown into action, when required, by the device now to be described.

133 is a bell-crank lever fulcrumed to the table. The spring 132 is connected to the vertical arm of the lever 133, and the horizontal arm of this lever is connected by a rod, 134, to a treadle, 135. It will be seen that when the treadle 135 is moved downward the strain will be thrown on the spring 132, and the rear end of the lever 127 will be drawn to one side every time the cam 102 is brought in position to allow the side movement of the stud 129 in the enlargement 131. The treadle 135 is normally held up by a spring, 136, and when in this position the spring 132 does not act on the lever.

137 is a ratchet-rack by which the treadle 135 may be held down in any desired position. The crimping is done while the leather edge 12 is firmly held by the gripper. The cam 102 turns loosely on the shaft 5.

138 and 139 are collars upon the shaft each side of the cam 102, said collars being made fast to the shaft by set-screws 140 or otherwise.

141 is a clutch wheel upon the shaft 5, having endwise movement on the shaft and working on a feather, 142, so that the hub rotates with the shaft. The wheel has a circumferential groove that is occupied by a yoke, 143, having ears 144 upon each side.

145 is a pin projecting from the side of the wheel 141 and adapted to enter a hole, 146, that passes through the cam 102. (See Figs. XIII, XIV, and XV.) The arrangement is such that when the wheel is moved toward the cam the pin enters the hole 146, and the cam is caused to revolve with the shaft.

147 is a bar rocking on a pin at 148. The bar 147 has upwardly-extending arms 149, whose ends pass through the ears 144, so that the rocking of the bar causes the movement of the wheel 141 to and from the cam 102.

150 is an upwardly-extending arm carrying a pin, 151, which is adapted to enter the hole 146 and prevent the rotation of the cam.

152 is a spring connecting one end of the rock-bar 147 to the base or floor. 153 is a spring connecting the other end of the rock-bar to a treadle-lever, 154, fulcrumed at 155 and held down by a spring-dog, 156 157, the latter denoting the spring by which the end 158 of the dog is held up. The construction is such that when the treadle-lever is depressed it engages beneath the dog 156. The pin 145 is pushed into the hole 146, causing the cam 102 to turn with the wheel and shaft. When the treadle-lever 154 is released by the depression of the end 158 of the dog, the springs 153 and 154 come to an equilibrium, and the pin 151 enters the hole 146 and stops the rotation of the cam. (See Figs. I, II, XII, XIV, and XV.) In Fig. XIV the parts are shown in the position last described. In order to insure the turning of the grippers with the sleeve the latter has recesses, as seen in Figs. XVIII, XIX, and XX, into which the gripper-jaws enter when the sleeve presses them together, as seen in Fig. XIX.

The tack-hopper and its actuating devices will now be described.

159 are vertical guides on the standard 8, giving bearing to a slide, 160, which slide has horizontal guides 161, giving bearing to another slide, 162. To the latter slide is attached by means of a bracket, 163, the tack-hopper. The tack-hopper has a box, 164, with a narrow mouth, 165, on its lower side, through which the tacks 11 escape into the inclined trough or chute 166, having inclined sides. 167 is a sliding door by which the mouth 165 may be partly or wholly closed when required.

168 are inclines at each side of the trough, between which are openings 169, which allow the passage of the head of the tack. In the bottom of the trough 166 is a slot, 170, to receive the shanks of the tacks, which enter the slot, while the heads ride upon the edges of the slot. The lower end, 171, of the trough is closed, except for a slot, 172, sufficient to allow the passage of the head of the tack when the shank of the tack is in the slot 170. The slot 170 is continued through the curved tack-race 173.

174 is a guide-lip extending over the tack-heads and preventing the escape of the tacks from the slot in the race. (See Figs. XXVII, XXVIII, XXIX, XXX, and XXXI.)

175 is a revolving disk, termed a "tack-deliverer," whose periphery passes in close proximity to the lower end of the tack-race. The disk has radial slots or recesses 176 in its edge of such a size as to receive and support a single tack with its head resting on top of the disk and the shank of the tack in the slot. The shank of the tack-hopper in its movements carries the tacks to the lower end of the race, and a single tack will enter the slot 176, which may be in line with the slot 172. This fills the slot 176 and prevents the escape of any more tacks from the race. Such escape is also prevented by the edge of the disk until another of the slots 176 is presented to the slot 170.

177 is a guard lip or flange, (see Figs. L, LI, and LII,) which prevents the escape of the tacks from the slots until the rotation and descent of the disk bring the tack to the guide-tube 178. The end 179 of the guard 177 is hinged so that it may swing upward and allow the escape of the tack at the proper time. The hinge is shown at 180.

181 is a spring tending to close the jointed end 179 to the edge of the disk after it has been swung up. The disk is upon a vertical shaft, 182, having bearing at 183 and 184 on arms of the tack-carrier frame. Fast to the upper side of the disk 175 is a crown-ratchet, 185, concentric with the disk.

186 is a cog-wheel turning loose on the shaft 182, and having at its lower end a crown-ratchet, 187, matching with the ratchet 185, so that when the cog-wheel is turned in one direction (which will be called "forward") it carries the disk with it; but when the cog-wheel is turned in the other direction the ratchet-teeth slip past each other, the wheel 186 lifting on the shaft. The wheel is chambered at 188, and said chamber contains a spiral spring, 189, that surrounds the shaft and has bearing at its upper end against the upper shaft-bearing, 183. The purpose of this spring is to assist in depressing the wheel to its lower position, with the ratchets 185 and 187 in engagement. (See Figs. XXVII, XXXII, XXXIII, XXXIV, and XXXV.)

190 is a cog-rack fixed to the standard 8 and engaging with the cog-wheel 186, the arrangement being such that as the tack-carrier (with its appurtenances) is moved forward the cog-wheel is also turned in its forward or active position, turning with it the tack deliverer or disk 175, and when the tack-carrier moves backward the ratchets slip past each other and the tack-deliverer remains at rest, as before explained. The tack-carrier has four motions—namely, forward, downward, backward, and upward, in the order named. These motions are produced as follows:

191 is a rod connecting the tack-carrier to an arm, 192, that is hinged to the table at 193. This arm has a side projection, 194, carrying a side stud at 195, engaging in the cam-groove 196 of a cam, 197. The cam moves the tack-hopper horizontally.

198 is a lug upon the slide 162, connected by a link, 199, with the lever 200. This lever is fulcrumed to the standard 8 at 201. The end of the lever has a side stud at 202 entering a cam-groove in the side of the rotary cam 197. The form and position of the cam-groove are indicated by broken lines at 202, the same being on the opposite side of the cam to the side in view. (See Figs. XXVII and XXVIII.) The tack-hopper, with its appendages, is shown in Fig. XXXIII, in full lines, in its upward and backward position. From this position it first moves horizontally forward into the position shown in broken lines in the same figure. The tack-hopper and appendages then move vertically into the position shown in full lines in Fig. XXXII. When in this position the tack 11 projects down into the tubular guide 178, which is so limited in diameter as to prevent the tack turning, so that it drops through the guide point first. On the backward movement of the hopper the tack is drawn from the slot 176 by the edge of the guide 178. Immediately beneath the tubular guide 178 is the conical recess 204, formed in the jaws 205 of the tack-carrier. The conical recess is of such size as to support the tack by the head in position to be driven into the edge 12 of the upper. The jaws are pivoted at 206 to a slide-bar, 207, which works in a bearing-socket in the standard 8.

208 is a horizontal slot made in the standard and communicating with said socket. Through the slot 208 projects a stud, 209, extending from the side of the slide-bar.

210 is a rod connected at one end to the slide-bar 207 and at the other to an oscillating arm, 211, hinged at the lower end to the table 2, and having at the upper end a side stud, 212, which works in the cam-groove 213 of the rotary cam 43. The inner end of the tack-carrier jaws are spread apart by a spring, 214, so as to hold their outer ends together with sufficient force to hold the tack, except when they are forced open by the tack-driver. When the tack-carrier is in its backward position, as seen in Figs. XXII, XXIII, and XLII, the conical recess is in line with the guide 178, and so in position for receiving the tack. When the tack-carrier is in the forward position, as seen in Fig. XXIII, the tack is in position for driving. The tack-driver and means for actuating it will now be described.

The driver or hammer consists of a vertical bar, 215, having bearing in the parts 92 and 93 of the standard 8 and capable of a limited vertical reciprocation.

216 is a spiral spring surrounding the driver. The upper end of the spring 216 bears against the under side of the part 92, and its lower end bears upon an adjustable collar, 217, fixed to the driver by a set-screw, 218. The lower end of the driver is of a diameter a little exceeding that of the head of the tack, so that it will force open the conical recess 204 on its descent and allow the tack free passage. On the upper end of the driver is a lip or catch, 219, that is engaged by a spring-latch, 220, working in the horizontal arm 221 of the rock-shaft 7. The latch is pressed forward by a spring, 223, inserted behind it in the guide-socket 222 of the latch.

224 is a pin or stud on the side of the latch, by means of which the latch is drawn back to trip the driver and allow it to descend upon the tack. The stud 224 extends through a slot, 225, in the arm 221. The vertical arm 226 of the rock-shaft 7 carries at the lower end a side stud, 227, which works in a cam-groove, 228, of the cam 83, said groove being shown by broken lines. A part of the standard 3 is broken out to show part of the arm 226, the rest being shown in full lines. This arm is also shown in Fig. I. The bell crank lever is fulcrumed on the rock-shaft 7.

229 is a sliding bar working in bearings 230 at the top of the standard 8, and having at the front end a standing finger, 231, which, when the sliding bar is drawn backward, acts on the pin or stud 224 and draws back the latch, releasing the driver and allowing it to descend.

232 is a lever whose upper end passes through an eye, 233, in the bar 229, and which lever is fulcrumed at 234 to the standard 8. The cam 197 has an inclined tooth, 235, which comes in contact with the lower end of the lever 232 and pushes it forward, thereby moving the upper end backward to trip the driver. When the driver is tripped it forces the tack through the conical recess in the tack-carrier and through the slot in the end of the folder, immediately after which the tack-carrier moves backward to receive another tack.

The driver is prevented from turning in its bearings by a vertical guide, 236, which extends from the part 92 to the part 93 of the standard 8, and which occupies a vertical notch in the collar 217. (See Fig. XXXVI.) It is necessary to restrict the driver to a simple vertical movement, for two reasons, namely: because the set 237, forming the lower end of the driver-bar, is not in the line of the axis of the driver-bar, and because if the bar turned it would disarrange the connection between the lip 219 and latch 220. This will be made apparent by examination of Fig. XXXVI. The lip 219 being on the rear side of the driver, it is obvious that if the driver were turned the latch 220 would not engage it. The turning of the driver would carry the eccentrically-placed set 237 out of line with the guide tube 178.

In operating the machine the last is held in the hands of the operator and pressed against the rollers 14 and 49 and is moved forward by the feed mechanism before described.

We claim as our invention—

1. In the herein-described lasting-machine, the combination of two rollers adapted to bear against the side of the upper upon the last and two wheels adapted to bear upon the top of the downturned edge 12 of the upper, thus forming points of bearing for the work.

2. The combination, in the herein described lasting-machine, of the two rollers bearing upon the side of the work, two wheels bearing upon top of the work, and a device, substantially as described, adapted to give intermittent rotary motion to one of the wheels, for the purpose set forth.

3. In the herein-described lasting-machine, the combination of the two rollers and two wheels bearing, respectively, against the side and top of the work and the fixed finger bearing upon the insole in advance of the folded part of the edge 12, substantially as set forth.

4. The combination, in the herein-described lasting-machine, of the side bearing-roller, 14, supported on a sliding bar, and a spring having bearing against the bar to keep the roller in contact with the work and allow the necessary horizontal movement of the work at this point.

5. The combination of the sliding bar 16, carrying a side bearing-roller, 14, and an adjustable spring, 19, bearing against the inner end of the bar, for the purpose set forth.

6. The combination of the roller 14, supporting slide-bar 16 therefor, spring 20, with end 19 bearing against the bar 16, spur-wheel 21 on the spring, and locking-bolt 24, securing the wheel in position, substantially as and for the purpose set forth.

7. The combination of the slide-bar 16, carrying bearing-roller 14, the spring 20, with end 19 resting against the end of the slide-bar 16, the spur-wheel 21, arm 23, with jointed end 26, segment rack or quadrant 25, a tooth on the jointed end 26 engaging the quadrant, and a bolt, 24, on the arm 23 engaging the spur-wheel, substantially as and for the purpose set forth.

8. In the herein-described lasting-machine, the top bearing feed-wheel, 28, supported on a slide, 34, and arranged to rotate on the backward movement of the slide, and a device, substantially as described, adapted to prevent the rotation of the feed-roller on the forward movement of the slide.

9. In the herein-described lasting-machine, the combination, with the feed-wheel, arranged to operate as set forth, the slide 34, on which the wheel is supported, actuating-lever 39, and spring-connection 37 between the slide and free end of the lever, substantially as and for the purpose set forth.

10. In the herein-described lasting-machine, the feed-wheel 28, slide 34, bearing the wheel, lever 39, spring 37, connecting the free end of the lever and the slide, and adjustable stop-bar 45, limiting the backward movement of the slide, substantially as set forth.

11. In the herein-described lasting-machine, the combination of the feed-wheel 28, ratchet-wheel 30, fixed to said roller, pawl 31, engaging the ratchet-wheel, and slide 34, upon which the roller has bearing, all substantially as and for the purpose set forth.

12. In the herein-described lasting-machine, the combination of the feed-wheel having capacity for rotating in only one direction and having reciprocating motion in the direction of the feed of the work, and the toothed wheel 52, bearing on the edge 12 of the upper, with pawl 53, preventing its backward rotation, for the purpose set forth.

13. The combination of the two guide rollers 14 and 49, the feed-wheel 28, the wheel 52, reciprocating slide 34, supporting the feed-wheel, slide actuating lever 39, spring-connection 37 between the lever and slide, and adjustable stop device 44 45, substantially as set forth.

14. The combination of the pusher 54, bearing intermittently against the side of the work, and the reciprocating folder 67, working over the pusher and adapted to force the edge 12 over the insole and fold it down on the insole, substantially as set forth.

15. The combination of the folder, a tilting block, 70, giving bearing to the folder and provided with an extension or tail, 84, and the cam 197, having a projecting part, 86, acting on the tail 84, substantially as and for the purpose set forth.

16. The combination of the pusher, the folder, the side guide-rollers, 14 49, and combined guide and feed wheels 28, and 52, acting to hold the upper in position on the last, substantially as set forth.

17. The combination, with the gripper-shaft 90, of a single lever, 98, having a pin, 100, at one end, said lever engaging at the other end the collar 94 on the shaft, a rotary cam, 102, whereby the lever is actuated directly by engagement with pin 100 to lower the shaft, and a spring, 113, attached to said lever to raise the shaft, substantially as shown and described, and for the purpose set forth.

18. The combination, with the shaft 90, carrying the grippers, of the sleeve 91, having on it a cog-wheel, 125, and a lever having a fixed segment-rack engaging the cog-wheel, and a spring connecting said lever to a fixed point and adapted to draw it to one side to cause the rotary motion of the gripper, substantially as and for the purpose set forth.

19. The combination, with the shaft 90 and sleeve 91, of the levers 98, 106, and 127, each having positive movement in one direction by means of cams and movement in the other direction by means of springs, substantially as and for the purpose set forth.

20. The combination of a shaft carrying pivoted gripper-jaws at its lower end and forced downward by a cam-lever and cam and carried upward by a spring, and a sleeve on the shaft having positive upward motion by a lever and cam and downward motion by a spring, substantially as and for the purpose set forth.

21. The combination of a shaft carrying grippers, having pivoted jaws and a spring for pressing them outwardly or opening them, said shaft and grippers being capable of vertical and rotary motion, and a sleeve capable of vertical motion on the shaft, but not of independent rotation, and constructed to force the jaws of the gripper together by downward movement on the shaft, substantially as set forth.

22. The combination of the shaft 90, the lever 98, engaging a collar fixed on said shaft, the actuating-cam 102, having a cam-groove, 101, receiving a stud, 100, on said lever, and having an enlargement, 122, and the spring 113, acting to draw the stud 100 aside in the enlargement, as and for the purpose set forth.

23. The combination of the sleeve 91, a lever, 106, whose free end engages in a circumferential groove of the sleeve, the actuating-cam 102, having a cam-groove, 109, receiving a stud, 108, on the lever, and having an enlargement at 123, and a spring, 124, drawing the stud upward in said enlargement of the cam-groove, as and for the purpose set forth.

24. The combination of the cog wheel or gear 125 on the sleeve 91, the lever 127, having a cog-segment engaging with the gear, a cam moving the lever in one direction, and a spring moving it in the other, substantially as and for the purpose set forth.

25. The combination of the crimping-lever 127, the spring 132, by which it is drawn in one direction, the lever 133, rod 134, and treadle 135, substantially as and for the purpose set forth.

26. The combination of the sleeve 91, shaft 90, gripper 87, gear and segment 125 and 126, lever 127, cam 102, and spring 132, substantially as and for the purpose set forth.

27. The combination, in a lasting-machine, of a gripper with a spring opening the jaws of the same, a rod or shaft carrying the gripper, a lever and cam adapted to depress the shaft, and a spring adapted to lift the shaft, a sleeve turning with the shaft and having vertical motion thereon and adapted to close the jaws of the gripper, as set forth, a lever and cam adapted to lift the sleeve, a spring adapted to lower the sleeve, a cog-gear on the sleeve, a lever having a cog-segment engaging the cog-gear on the sleeve, a cam adapted to swing the lever in one direction, and a spring adapted to swing the lever in the other direction, substantially as set forth.

28. A lasting-machine having a tack-hopper with an inclined trough-chute, with inclines 168 at each side of the chute and slot 170 in the bottom, substantially as and for the purpose set forth.

29. The combination, in the tack-hopper of a lasting-machine, of the hopper with narrow mouth, an inclined chute with side inclines, 168, and slot 170, the lower end, 171, with aperture 172 for the heads of the tacks, and the tack-race forming an extension of the chute and slotted throughout its length for the shank of the tack, substantially as set forth.

30. In a lasting-machine, the combination of the tack-race 173 with slot 170, adapted to receive the shank of the tacks, and the tack-deliverer 175, with its marginal recesses 176 and guard-lip 177, for the purpose set forth.

31. In a lasting-machine, the combination of the tack-deliverer 175, having marginal slots or recesses 176, the guard-lip 177, and the jointed section 179, allowing the escape of the tack from the front slot of the deliverer, substantially as set forth.

32. In a lasting-machine, the combination, with the rotary tack-deliverer, of the ratchet-clutch 185 187, cog-wheel 186, held down by spring 189, and fixed cog-rack engaging with the cog-wheel, substantially as set forth.

33. In a lasting-machine, the combination of the rotary tack-deliverer and the tack-guide 178, receiving the point of the tack as the deliverer moves downward with the tack-hopper and removing the tack from the slot as the deliverer moves backward with the hopper.

34. The combination, in a lasting-machine, of the tack-carrier composed of spring-jaws, a slide-bar, 207, to which the jaws are pivoted, and a cam adapted to actuate the slide-bar, substantially as set forth.

35. In a lasting machine, a tack-driver, 215, a spring, 216, acting to force the driver downward, a spring-catch, 220, engaging the driver when in its lower position, a lever-arm, 221, in which the catch has bearing, and a suitable device to retract the catch and release the driver, substantially as shown and described.

36. The tack-driver, a spring pressing the driver down, a lever having a retractible latch, a cam imparting to the lever a reciprocating motion, and a slide-bar with a finger adapted to retract the latch and actuated by a cam projection, substantially as and for the purpose set forth.

37. A lasting-machine having the following combination: guide-rollers and combined guide and feed wheels for the work, a gripper and crimper on a rotary shaft having positive downward motion and upward motion by means of a spring, a sleeve upon and turning with the gripper-shaft, having independent positive upward motion and downward motion by means of a spring, a cog-gear on the sleeve engaged by a cog-rack on a lever having positive motion in one direction and moved in the other direction by a spring, a spring-pusher and a folder, and means, substantially as set forth, to feed and drive the tack, as set forth.

CHAS. SINNING.
JOHN T. AVERY.

Witnesses:
SAML. KNIGHT,
JOS. WAHLE.